(12) United States Patent
Brunengo

(10) Patent No.: US 7,566,431 B2
(45) Date of Patent: Jul. 28, 2009

(54) METHOD FOR THE TREATMENT OF COMBUSTION FLUE GAS

(75) Inventor: Paolo Brunengo, Lugano (CH)

(73) Assignee: Urea Casale S.A. (CH)

( * ) Notice: Subject to any disclaimer, the term of this patent is extended or adjusted under 35 U.S.C. 154(b) by 102 days.

(21) Appl. No.: 10/595,535

(22) PCT Filed: Sep. 7, 2004

(86) PCT No.: PCT/EP2004/009936

§ 371 (c)(1),
(2), (4) Date: Jan. 3, 2007

(87) PCT Pub. No.: WO2005/049178

PCT Pub. Date: Jun. 2, 2005

(65) Prior Publication Data

US 2007/0212287 A1 Sep. 13, 2007

(30) Foreign Application Priority Data

Nov. 5, 2003 (EP) .................................. 03025219

(51) Int. Cl.
*B01D 53/56* (2006.01)

(52) U.S. Cl. .................................... 423/235; 423/239.1

(58) Field of Classification Search ................. 423/235, 423/239.1
See application file for complete search history.

(56) References Cited

U.S. PATENT DOCUMENTS

| 6,093,380 A | 7/2000 | Lagana et al. |
| 6,361,754 B1 | 3/2002 | Peter-Hoblyn et al. |
| 2004/0146441 A1* | 7/2004 | Lang et al. ................... 423/235 |
| 2005/0129599 A1* | 6/2005 | Berriman et al. ............ 423/235 |

FOREIGN PATENT DOCUMENTS

| EP | 1 089 804 | 4/2001 |
| WO | WO 97/15388 | 5/1997 |

* cited by examiner

*Primary Examiner*—Timothy C Vanoy
(74) *Attorney, Agent, or Firm*—Akerman Senterfitt

(57) ABSTRACT

A method for the removal of nitrogen oxides contained in combustion flue gas through treatment with gaseous ammonia, in which the gaseous ammonia is generated in situ by hydrolysis reaction of an aqueous urea solution (L4) whereby the ammonia generated by the hydrolysis (L5) is accumulated in gaseous state, under pressure, in an accumulator (A5).

7 Claims, 1 Drawing Sheet

METHOD FOR THE TREATMENT OF COMBUSTION FLUE GAS

CROSS-REFERENCE TO RELATED APPLICATIONS

This application is a §371 national stage of PCT/EP2004/009936, filed Sep. 7, 2004, which claims priority to European Patent Application No. 03025219.1, filed Nov. 5, 2003, both of which are hereby incorporated by reference.

FIELD OF APPLICATION

The present invention, in its most general aspect, refers to a method for the treatment, or conditioning of combustion flue gas.

In particular, the invention concerns a method for the damp (removal) of nitrogen oxides ($NO_x$) present in combustion flue gas, through their reduction with gaseous ammonia ($NH_3$).

More specifically, the invention refers to a method of the aforementioned type, where the gaseous ammonia used is generated in situ by hydrolysis of urea ($NH_2CONH_2$).

PRIOR ART

It is known, in industrial plants of substantial size, to subject combustion flue gas to specific treatment or conditioning methods in order to reduce the polluting load thereof and with it the harmful emissions that said gas gives to the environment.

It is also known, amongst the various treatment methods, to damp or remove nitrogen oxides ($NO_x$ where x is a whole number generally 1 or 2), contained in the gas, through reduction of said oxides with gaseous ammonia ($NH_3$).

To quickly get hold of the gaseous ammonia necessary in a method of this type, avoiding the risks involved in transportation and storage of ammonia, or its concentrated solutions, the prior art provides methods for damping nitrogen oxides in which the gaseous ammonia, used for such a purpose, is produced in situ, in other words at the same plant where the combustion flue gas which contains said oxides is generated.

In such a method, the gaseous ammonia is generated by hydrolysis of an aqueous urea solution, and is subsequently stripped away from the solution with hot steam, for example as described in patent EP-A-1 089 804.

Although advantageous, a technique of this type does not lack drawbacks, the main one of which consists of the incapability of quickly satisfying variations in the requirement for gaseous ammonia. In other words, from the different amount between the gaseous ammonia produced by hydrolysis of urea at a predetermined moment in time and the gaseous ammonia necessary at such a moment in time for the total reduction in the nitrogen oxides. This is because the nitrogen oxide content in the gas to be conditioned can be variable through time.

Furthermore, for example, the gas to be conditioned can come from many combustion sites within the plant and contain different percentages of the different possible nitrogen oxides, with the consequent different reducing gaseous ammonia requirement for each site where there is generation of combustion flue gas, that is for each site where such gas is treated (conditioned).

SUMMARY OF THE INVENTION

The technical problem underlying the present invention is that of devising and providing a method for the damp of the nitrogen oxides contained in combustion flue gas through treatment with gaseous ammonia, in which said gaseous ammonia is generated in situ by hydrolysis of an aqueous urea solution, and having functional characteristics such that the cited drawbacks linked to the prior art are totally overcome.

Such a problem is solved according to the invention by a method of the type considered above, characterized in that the ammonia generated by said hydrolysis is accumulated (collected) in gaseous state, under pressure, in an accumulator (tank).

The advantages and the features of the method according to the present invention will become clearer from the description of an exemplificative embodiment thereof, made herein below with reference to the attached drawings, for indicative and non-limiting purposes.

DETAILED DESCRIPTION

Figure 1:
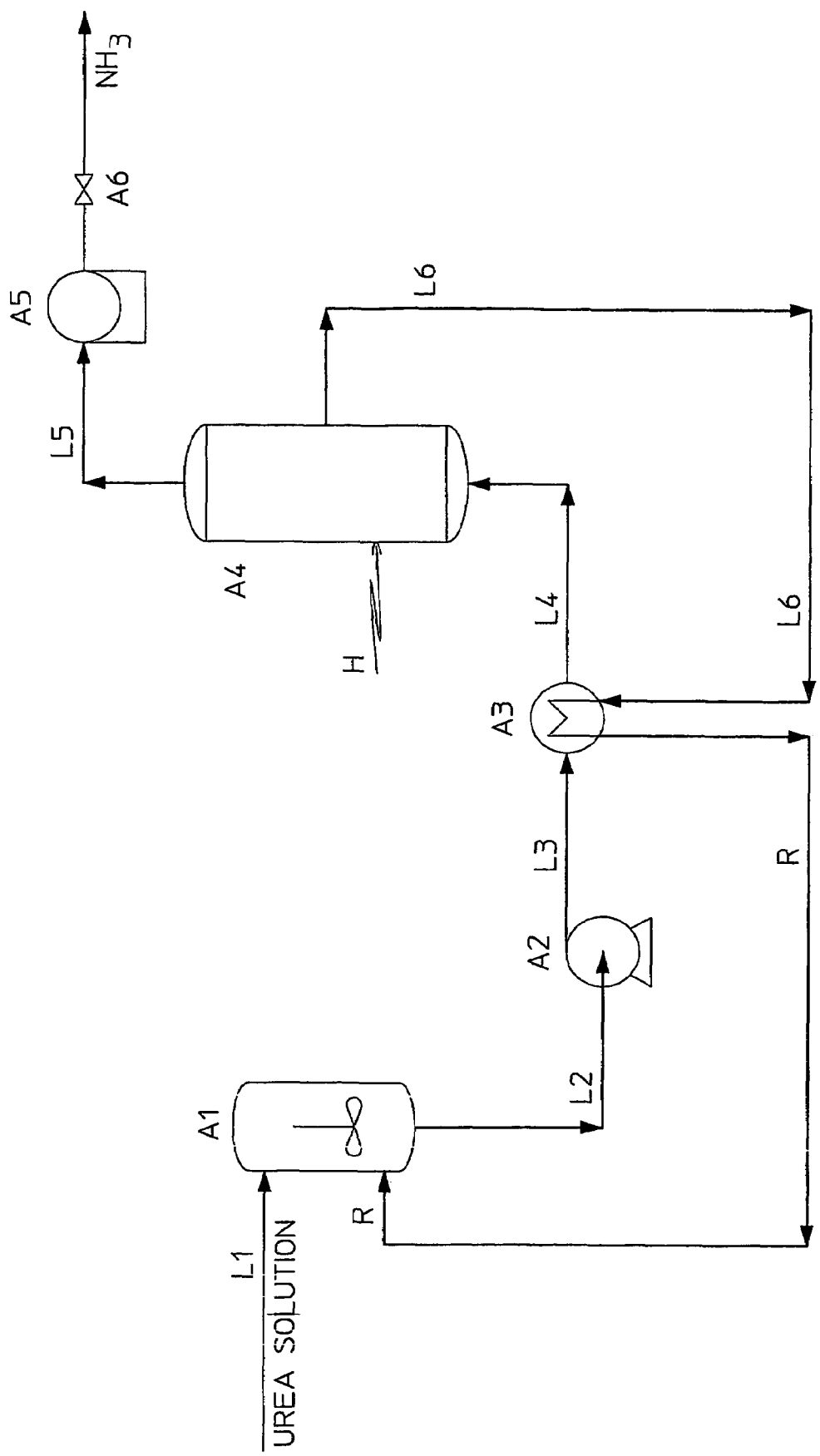
FIG. 1 shows a schematic diagram of the conditioning method according to the present invention.

With reference to FIG. 1, an embodiment of the method for damping nitrogen oxides according to the present invention shall now be described.

In operating conditions, a concentrated aqueous urea solution (L1), containing from 60% to 90% by weight urea, preferably containing 80% by weight urea, is fed to a mixer (A1) where it is diluted, in the way described later on, to a concentration of between 10% and 70% by urea weight, preferably to a concentration equal to 40% by urea weight, to be sent then to a pump (A2).

In said pump (A2), the aqueous urea solution (L2) coming from the mixer (A1) is subjected to a pressure of between 500 kPa and 3000 kPa, preferably to a pressure of 2500 kPa, i.e. to a value equal to the operating hydrolysis pressure, as shall become clearer in the rest of the description.

The pressurized urea solution (L3) coming out from the pump (A2) is then sent to a heat exchanger (A3) where it is heated to a temperature of between 100° C. and 240° C., in the way described later on.

The hot and pressurized urea solution (L4) coming out from the exchanger (A3), with a urea content equal to 40% by weight, is then fed to a hydrolyser (A4) which for example operates at a pressure value of 2500 kPa and at a temperature of 210° C.

To reach and maintain such a temperature, the hydrolyser (A4) is heated by indirect heat exchange through an auxiliary heating agent (H) fed to it, which for example can be steam, oil and similar heating agents, or else through electrical heating.

In said hydrolyser (A4) the hydrolysis reaction of the urea solution (L4) takes place; in such reaction 99.8% of the urea in aqueous solution is hydrolyzed generating as hydrolysis products gaseous ammonia and carbon dioxide.

Said gaseous hydrolysis products are then stripped and separated from the liquid phase by means of steam, preferably generated by evaporation from the aqueous urea solution, in a per se known way; advantageously, they are stripped as described in patent application WO 97/15388 of the Applicant herself, and incorporated here for reference, apart from that in this example the stripping agent is not added but generated from the aqueous urea solution itself.

In accordance with the present invention, said gaseous hydrolysis products (L5), stripped away, at the same hydrolysis pressure, from the aqueous solution, and coming out from the hydrolyser (A4), are accumulated at this same pressure in an accumulator (tank) (A5).

From said accumulator (A5), the pressurized gaseous ammonia is introduced according to needs, and through passage through a pressure adjustment valve (A6) (reducing valve), into the current of combustion flue gas to be conditioned, where in the presence of oxygen it reduces the nitrogen oxides contained in said gas leading to the formation of nitrogen and water.

During the hydrolysis reaction a hot aqueous solution (L6) (hydrolysis solution) is also generated which contains a small percentage of non-hydrolyzed urea, and small amounts of gaseous ammonia and carbon dioxide left in solution.

Advantageously, said hot aqueous solution (L6) coming out from the hydrolyser (A4) is sent to the exchanger (A3), in which, through a heat exchange, the aforementioned preheating of the pressurized aqueous urea solution (L3) and the simultaneous cooling of said aqueous hydrolysis solution (L6) are accomplished.

Preferably, said aqueous hydrolysis solution is used as aqueous recycling solution (R), which is sent to feed the mixer (A1) where it expands to the pressure value of the mixer (A1), and where it realizes the dilution of the concentrated aqueous urea solution (L1), as described previously.

The main advantage of the method according to the present invention lies in the possibility of constantly having, in variable amounts through time, gaseous ammonia produced in situ, thanks to its pressurized accumulation in the accumulator (A5), in this way allowing consumption peaks of gaseous ammonia to be satisfied.

In practice, through the accumulator (A5) it is possible to diversify through time (to dose) the introduction of gaseous ammonia into the gas to be conditioned according to the actual requirement of ammonia necessary for the reducing reaction of the nitrogen oxides; this actual requirement can be discontinuous or in any case not constant over a period of time, in connection for example with the different operating steps of the plant where said gas to be conditioned is generated.

Another advantage of the method according to the present invention lies in the possibility of being able to assign the gaseous ammonia produced to many users in parallel, for example for many sites where said gas to be conditioned is produced, even if they should require, independently of each other, a variable amount of gaseous ammonia, this is thanks to the pressurized accumulation of ammonia itself in the accumulator (A5), which, constituting a sort of gaseous ammonia reserve, ensures the constant availability thereof in relation to the actual requirement.

Furthermore, is should be stated that the above is made possible precisely in virtue of the pressurized accumulation of ammonia, which provides gaseous ammonia at a pressure such as to allow the overcoming of the possible pressure drops due to the paths which separate the accumulator from the introduction point of the gaseous ammonia into the current of gas to be conditioned.

Finally, a further advantage of the method according to the present invention lies in the heat exchange which takes place in the heat exchanger, through which there is a preheating of the urea solution with a consequent energy saving on the energy consumption of the entire method.

Moreover, at the same time as said preheating, the overcooling of the aqueous solution coming from the hydrolysis reaction is obtained, which advantageously allows the formation of steam to be avoided during the expansion in the mixer of the aqueous recycling solution which leaves the exchanger.

Of course, a man skilled in the art, in order to satisfy contingent and specific requirements, can make numerous modifications, all of which are in any case contained within the scope of protection of the invention as defined by the claims listed hereafter.

Thus, for example, the gaseous ammonia can be accumulated at a pressure lower than the hydrolysis pressure. Advantageously, the gaseous ammonia can be accumulated at a pressure value between that at which the hydrolyser operates and the introduction pressure of the gaseous ammonia into the current of gas to be conditioned, subject to passage of the gaseous ammonia through a pressure reducing valve placed between the hydrolyser and the accumulator.

Furthermore, in the conditioning method according to the present invention, solid urea can be fed to the mixer (A1), in this case inside of it the dissolution of said solid urea also takes place through the recycling solution (R), which advantageously constitutes the means for such dissolution.

The invention claimed is:

1. A method for the removal of nitrogen oxides contained in combustion flue gas through treatment with gaseous ammonia, the method comprising:
   generating gaseous ammonia in situ by hydrolysis reaction of an aqueous urea solution; and
   accumulating the ammonia generated by said hydrolysis in gas state, under pressure, in an accumulator,
   wherein the pressure at which said gaseous ammonia is accumulated is between the pressure at which said hydrolysis reaction takes place and the pressure at which it is introduced into the combustion flue gas.

2. The method for the removal of the nitrogen oxides contained in combustion flue gas according to claim 1, wherein said aqueous urea solution is preheated in a heat exchanger through heat exchange with a hot aqueous hydrolysis solution generated in said hydrolysis reaction, and in that said aqueous hydrolysis solution, following said heat exchange, is overcooled and then used as recycling solution.

3. The method for the removal of the nitrogen oxides contained in combustion flue gas according to claim 2, wherein said recycling solution is fed to a mixer for the formation, together with a concentrated aqueous urea solution and/or solid urea, of said aqueous urea solution.

4. The method for the removal of nitrogen oxides according to claim 1, wherein at least 99.8% of said urea in aqueous solution is hydrolyzed under pressure generating gaseous ammonia.

5. The method for the removal of nitrogen oxides according to claim 1, wherein the aqueous urea solution subjected to said hydrolysis reaction has a urea content of between 10% and 70% by weight.

6. The method for the removal of nitrogen oxides according to claim 1, wherein the temperature at which said hydrolysis reaction takes place is between 100° C. and 240° C.

7. The method for the removal of nitrogen oxides according to claim 1, wherein the pressure at which said hydrolysis reaction takes place is between 500 kPa and 3000 kPa.

* * * * *